(12) United States Patent
Bontu et al.

(10) Patent No.: US 6,363,130 B1
(45) Date of Patent: Mar. 26, 2002

(54) DETECTION OF ACCESS BURSTS IN TDMA COMMUNICATIONS SYSTEMS

(75) Inventors: Chandra Sekhar Bontu; Yonghai Gu, both of Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/030,551

(22) Filed: Feb. 26, 1998

(30) Foreign Application Priority Data

Oct. 10, 1997 (CA) .............................................. 2218321

(51) Int. Cl.[7] .............................. H04L 7/00; H04B 7/212
(52) U.S. Cl. ......................................... 375/366; 370/442
(58) Field of Search ........................ 375/366; 455/33.1; 370/442

(56) References Cited

U.S. PATENT DOCUMENTS

| 4,366,481 A | * 12/1982 | Main et al. | 340/10.41 |
| 5,592,518 A | * 1/1997 | Davis et al. | 375/368 |
| 5,603,081 A | * 2/1997 | Raith et al. | 455/33.1 |
| 5,629,958 A | * 5/1997 | Willming | 375/295 |
| 6,161,209 A | * 12/2000 | Moher | 714/780 |

FOREIGN PATENT DOCUMENTS

CA 50251/33 * 2/1993

* cited by examiner

Primary Examiner—Chi Pham
Assistant Examiner—Tony Al-Beshrawi (57) ABSTRACT

The timing of an access burst received in a base station of a wireless communications system is determined by detecting one or more zero bit fields, constituting predetermined sequences of identical consecutive symbols in the access burst. For each possible timing of the access burst, whether a predetermined sequence is present in the respective position in the access burst is detected by predicting a sample of the received signal in the current symbol period from a sample of the received signal in the preceding symbol period assuming identity of symbols in the current and preceding symbol periods, producing a squared distance between predicted and received samples for the current symbol period, producing a threshold in dependence upon a power of the received signal for the preceding symbol period to accommodate fading, and comparing the squared distance with the threshold, continuing for successive current symbol periods until the end of the sequence or until the respective threshold is exceeded. The squared distances are accumulated for each possible timing, the least accumulated squared distance determining which of the possible timings for which the predetermined sequences are detected, if there is more than one, is the access burst timing.

25 Claims, 3 Drawing Sheets

DETECTION OF ACCESS BURSTS IN TDMA COMMUNICATIONS SYSTEMS

This invention relates to the detection of access bursts in TDMA (Time Division Multiple Access) cellular radio or wireless communications systems.

BACKGROUND OF THE INVENTION

In a cellular mobile radio communications system using TDMA, it is known to adjust the timing of time slot bursts transmitted from each mobile station to a base station so that bursts received by the base station from different mobile stations are aligned in time in their respective time slots. This time alignment typically comprises a fixed or standard offset time between reverse and forward time division multiplex frame timing (forward refers to the downlink transmission direction from the base station to the mobile station, and reverse refers to the opposite or uplink direction of transmission), and a time alignment advance (or retard) which varies according to the signal propagation time (i.e. the distance) between the mobile station and the base station.

In order to determine an initial time alignment for a mobile station newly communicating with a base station, the base station provides to the mobile station an initial traffic channel designation and instructs the mobile station to transmit access bursts, also referred to as shortened bursts, on this channel using the standard offset. The base station then attempts to monitor the access bursts and to determine from their timing an appropriate time alignment advance for the mobile station. This process is complicated by the fact that at this time the carrier offset, sample timing offset, and channel impairments are unknown at the base station receiver. The base station then communicates the time alignment advance to the mobile station as an initial time alignment for the mobile station to use for subsequent transmission of normal bursts to be received at the base station with the correct time relationship.

By way of example, in a TDMA cellular radio system that operates compatibly with EIA/TIA document IS-54-B: Cellular System Dual-Mode Mobile Station—Base Station Compatibility Standard (Rev. B), referred to herein simply as an IS-54 system, the access (shortened) burst has a predetermined form, described further below, comprising guard and ramp times, a sync word S, a CDVCC (coded digital verification colour code) word D, and fields V, W, X, and Y that comprise different numbers of zero bits. The sync word S is one of six defined sequences of 14 symbols identifying respective time slots and also used for synchronization and equalizer training. The CDVCC word D comprises 6 symbols (12 bits) having any of 255 distinct values used to identify a cell. Consequently, the entire content of the access burst, which comprises repeated occurrences of the words S and D, is known to the base station. The access burst has different numbers of symbols between any two occurrences of the sync word, so that the initial time alignment for the mobile station can be determined by the base station after detection of any two or more sync words of the access burst.

Having instructed a newly communicating mobile station to transmit access bursts with a particular sync word, the base station expects to detect this sync word in such an access burst. If, during the period that the base station is monitoring received signals to detect the expected sync word, this same sync word is produced as part of a burst from a different mobile station in a neighbouring cell of the system, then the base station may falsely lock onto this. In consequence, it may determine an incorrect initial time alignment for the newly communicating mobile station and transmit this with a message to the newly communicating mobile station to instruct it to transmit normal bursts, resulting in undesired interference and the risk of disrupted communications. This problem is exacerbated with increasing numbers of mobile stations (for example at busy times of the cellular communications system) and with reducing cell sizes.

This problem can be avoided or eliminated by having the base station check more thoroughly the form of the burst which it receives and interprets as the access burst, for example by checking for more occurrences of the sync word and for the correct CDVCC word D. However, this requires more computation in the base station, and this presents a particular problem at the system's most busy times when the computing resources of the base station may already be fully utilized.

A further problem can occur in that the accuracy with which the timing of the access burst, and hence the initial time alignment of the mobile station, is determined is adversely affected by multipath fading of the signal transmitted by the mobile station.

Accordingly, an improved method is desired for detecting access bursts, which avoids or eliminates the problems discussed above and does not increase, and advantageously decreases, the computing resources required of the base station.

An object of this invention is therefore to provide an improved method of and apparatus for detecting access bursts in a TDMA communications system.

SUMMARY OF THE INVENTION

According to one aspect, this invention provides a method of detecting an access burst in a TDMA communications system using differential modulation, the access burst including at least one predetermined sequence of $N_T$ consecutive identical symbols in a predetermined position in the burst, where $N_T$ is an integer greater than an integer L representing a number of symbol periods over which the system has channel dispersion, comprising sampling a received signal and detecting the predetermined sequence in the received signal by the steps of, for each of $N_T$-L current symbol periods ending the predetermined sequence: predicting at least one sample of the received signal in the current symbol period from at least one sample of the received signal in the preceding symbol period assuming identity of symbols represented by the received signal in the current and preceding symbol periods; producing a squared distance between at least one sample of the received signal in the current symbol period and the predicted at least one sample; and comparing the squared distance with a threshold to determine said identity if the threshold is not exceeded.

In order to adjust the threshold for a fading channel such as in a wireless communications system, the method preferably includes the step of, for, each of the $N_T$-L current symbol periods, producing the threshold in dependence upon a power of the received signal in the preceding symbol period.

The method preferably includes the step of accumulating the squared distance for a purality of the $N_T$-L current symbol periods. The steps are desirably performed for each of a plurality of predetermined sequences in the access burst, and each of the predetermined sequences can for example represent a zero bit field in the access burst. Thus, in particular, at least one predetermined sequence can comprise at least one of zero bit fields W, X, and Y of an access burst of an IS-54 system, together with any zero bit symbols at the end of a CDVCC word preceding, and any zero bit symbols at the beginning of a sync word following, each of said fields W, X, and Y, and preferably said steps are carried out for each of a plurality of said fields W, X, and Y.

Another aspect of the invention provides a method of determining timing of an access burst received in a TDMA wireless communications system using differential modulation, the access burst including at least one predetermined sequence of $N_T$ consecutive identical symbols in a predetermined position in the burst, where $N_T$ is an integer greater than an integer L representing a number of symbol periods over which the system has channel dispersion, comprising the steps of: sampling a received signal; for each of a plurality of possible timings of the access burst, detecting whether the predetermined sequence is present in the respective position in the access burst by performing the following steps (a) to (d) either for $N_T$-L current symbol periods which end the predetermined sequence if the access burst has the respective timing or until the squared distance in step (d) for the current symbol exceeds the respective threshold: (a) predicting at least one sample of the received signal in the current symbol period from at least one sample of the received signal in the preceding symbol period assuming identity of symbols represented by the received signal in the current and preceding symbol periods; (b) producing a squared distance between predicted and received samples for the current symbol period; (c) producing a threshold in dependence upon a power of the received signal for the preceding symbol period; and (d) comparing the squared distance with the threshold; and determining the timing of the access burst in dependence upon results of the detection of the predetermined sequence for said possible timings of the access burst.

The step of determining the timing of the access burst in dependence upon results of the detection of the predetermined sequence for said possible timings of the access burst preferably comprises, for each of said possible timings for which steps (a) to (d) are carried out for $N_T$-L current symbol periods without the squared distance in step (d) exceeding the respective threshold, accumulating the squared distance produced in each step (b), and determining as the timing of the access burst one of said possible timings having a least accumulated squared distance.

Advantageously, said steps of detecting whether the predetermined sequence is present in the respective position in the access burst are performed, for each of the plurality of possible timings of the access burst, for each of a plurality of predetermined sequences in respective predetermined positions in the access burst. For example the at least one predetermined sequence can comprise at least one of zero bit fields W, X, and Y of an access burst of an IS-54 system, together with any zero bit symbols at the end of a CDVCC word preceding, and any zero bit symbols at the beginning of a sync word following, each of said fields W, X, and Y.

The invention also provides a method of detecting an access burst in a TDMA communications system not using differential modulation, the access burst including at least one predetermined sequence of $N_T$ consecutive identical symbols in a predetermined position in the burst, where $N_T$ is an integer greater than L+1 and L is an integer representing a number of symbol periods over which the system has channel dispersion, comprising sampling a received signal and detecting the predetermined sequence in the received signal by the steps of, for each of $N_T$-(L+1) current symbol periods ending the predetermined sequence, producing a squared distance between samples of the received signal in the current and preceding symbol periods, and comparing the squared distance with a threshold to determine said identity if the threshold is not exceeded.

Again in this case, the method can include the steps of, for each of the $N_T$-(L+1) current symbol periods, producing the threshold in dependence upon a power of the received signal in the preceding symbol period, and accumulating the squared distance for a plurality of current symbol periods, and the steps can be performed for each of a plurality of predetermined sequences in the access burst.

Viewed in a manner that is generic regardless of whether or not differential modulation is used, the invention provides a method of detecting an access burst in a TDMA communications system, the access burst including a predetermined sequence of consecutive identical symbols in a predetermined position in the burst, comprising detecting the predetermined sequence by the steps of, for each of a plurality of current symbol periods of a subset of the consecutive identical symbols ending said predetermined sequence and for which a received signal waveform can be predicted from a received signal waveform in a preceding symbol period: producing a prediction of the received signal waveform for the current symbol period from the received signal waveform for the preceding symbol period assuming identity of symbols in the current and preceding symbol periods; producing a squared distance between the prediction and the received signal waveform for the current symbol period; and comparing the squared distance with a threshold to determine said identity if the threshold is not exceeded.

The number of samples that can be predicted from respective preceding samples, and hence the size of the subset of consecutive identical samples ending the predetermined sequence which can be detected, is dependent upon the modulation scheme used and the channel dispersion, as well as the size of the predetermined sequence.

The invention also provides apparatus for detecting an access burst received in a TDMA communications system, comprising: a buffer for samples of a received signal; means for producing a squared distance between samples of the received signal in a current symbol period and a preceding symbol period; means for producing a threshold dependent upon a power of the received signal in the preceding symbol period; means for comparing the squared distance with the threshold thereby to determine identity of symbols in the current and preceding symbol periods when the squared distance is less than the threshold; and control means for controlling selection of samples supplied from the buffer as the samples of the received signal in the current and preceding symbol periods, the control means being responsive to an output of the means for comparing for identifying samples of the received signal representing a predetermined sequence of consecutive identical symbols in the access burst.

When the TDMA communications system uses differential modulation, the means for producing the squared distance preferably includes means for predicting at least one sample for the current symbol period from at least one sample for the preceding symbol period in accordance with the differential modulation assuming identity of symbols in the current and preceding symbol periods.

The apparatus preferably includes means for accumulating the squared distance for a plurality of consecutive current symbol periods, and preferably the control means is arranged for controlling said selection of samples supplied from the buffer for identifying samples of the received signal representing each of a plurality of predetermined sequences of consecutive identical symbols in the access burst.

BRIEF DESCRIPTION OF THE DRAWINGS

The invention will be further understood from the following description with reference to the accompanying drawings, in which.

DESCRIPTION OF THE PREFERRED EMBODIMENTS

Figure 1:
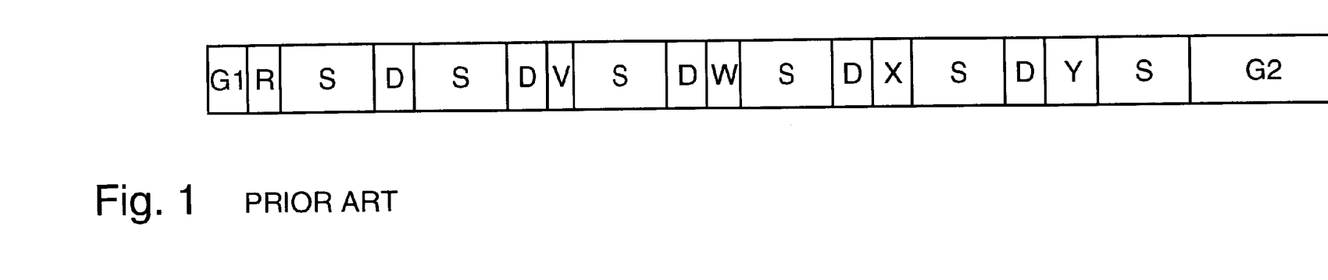
FIG. 1 diagrammatically illustrates the known form of an access burst of an IS-54 system.

Referring to FIG. 1, the known form of an access burst of an IS-54 system, referred to as a shortened burst in the EIA/TIA IS-54-B document, is illustrated. The burst comprises 162 symbols, each symbol representing 2 bits in accordance with a π/4 shifted DQPSK (differential quadrature phase shift keyed) modulation scheme used in the system, in the sequence represented in FIG. 1. The parts of the access burst as shown in FIG. 1 are as follows:

G1 a 3 symbol length guard time;

R a 3 symbol length ramp time;

S the assigned sync word of 14 symbols;

D the assigned CDVCC of 6 symbols;

G2 a 22 symbol length guard time;

V a field of 2 symbols representing the 4 bits 00 00;

W a field of 4 symbols representing the 8 bits 00 00 00 00;

X a field of 6 symbols representing the 12 bits 00 00 00 00 00 00; and

Y a field of 8 symbols representing the 16 bits 00 00 00 00 00 00 00 00.

It can be appreciated that the different occurrences of the sync word S in the access burst are separated by different numbers of symbols due to the different sizes of the zero bit fields V, W, X, and Y between these occurrences, and the absence of any zero bit field between the first two occurrences of the sync word S in the access burst. Consequently, the number of symbols between any two occurrences of the sync word S in the access burst is unique to these two particular occurrences, so that detection by a base station of any two occurrences of the sync word in the access burst fully determines the timing of the entire burst. As explained in the background of the invention, this enables a base station to detect the access burst quickly, but there are problems in relying on this especially in the presence of interfering signals and multipath fading.

This invention recognizes that the zero bit fields V, W, X, and Y provide sequences of consecutive identical bits, and hence symbols for transmission, which can potentially be detected to enable the timing of the access burst to be determined by the base station, without necessarily detecting at the same time the sync word S and/or the CDVCC word D.

However, this detection is complicated by channel dispersion and by the possible presence of further zero bit symbols adjacent to the zero bit fields V, W, X, and Y, i.e. by consecutive zero bit symbols at the end of the CDVCC word D that precedes each zero bit field V, W, X, and Y and/or at the start of the sync word S that follows each zero bit field V, W, X, and Y.

Considering first the issue of channel dispersion, where, as in a cellular radio communications system, a signal is transmitted via a multipath channel, then, in the absence of thermal noise, the signal $r_k$ received in a time interval from $kT$ to $(k+1)T$, where k is an integer and T is the symbol period, is a function of the time-varying channel characteristic and a vector $U_k$ of the current transmitted symbol $u_k$ and the previous L transmitted symbols $u_{k-1}$ to $u_{k-L}$ where the channel dispersion is not more than L symbol periods and L is an integer. For an IS-54 system, a value of L=1 is typical. The vector $U_k$ is referred to as the transmission state.

Consequently, if the time-varying changes in the channel characteristics occur slowly in relation to the symbol period T, then in sufficiently long sequences of consecutive identical transmitted symbols the received signal waveform during later symbol intervals can be predicted from the received signal waveform for respective preceding symbol intervals.

More particularly, in a system (such as an IS-54 system) using differential modulation, when a sequence of L+N identical consecutive symbols is transmitted, where N is a positive integer, then the received signal for the last N symbol intervals of the sequence can be substantially predicted from the received signal for the respective preceding symbol interval. The prediction is for the same symbol in accordance with the differential modulation, e.g. with a π/4 phase shift for repeated zero bit symbols in the π/4 shifted DQPSK modulation scheme of an IS-54 system.

The detailed description below relates to an IS-54 system and hence to a system using differential modulation, but it can be appreciated that the principles of the invention are also applicable to a system not using differential modulation. In such a system, the received signal for each of the last N−1 (N>1) symbol intervals of the L+N symbol sequence is substantially the same as the received signal for the respective preceding symbol interval.

As indicated above, any zero bit symbols (i.e. symbols each representing two consecutive zero bits 00) at the end of the CDVCC word D and/or at the start of the sync word S will extend the numbers of consecutive identical zero bit symbols that occur in the access burst in association with the zero bit fields V, W, X, and Y. More particularly, if the CDVCC word D ends with $N_D$ consecutive zero bit symbols, and the sync word S starts with $N_S$ consecutive zero bit symbols, where $N_D$ and $N_S$ can each be zero or a positive integer, and $N_Z$ represents the number of symbols in the respective zero bit field V, W, X, or Y (i.e. $N_Z$=2 for the field V, 4 for the field W, 6 for the field X, and 8 for the field Y), then the access burst contains sequences of $N_T = N_D + N_Z + N_S$ zero bit symbols. As described below, the base station uses one or more of these sequences for which $N_T > L$ to determine the timing of the access burst. In this respect it is observed that the base station already has information identifying the CDVCC word D and the sync word S that are used by the mobile station transmitting the access burst, so that it can readily determine the integers $N_D$ and $N_S$ for the respective mobile station and access burst, and the numbers $N_Z$ are defined for the respective zero bit fields and hence are also known by the base station.

Figure 2:
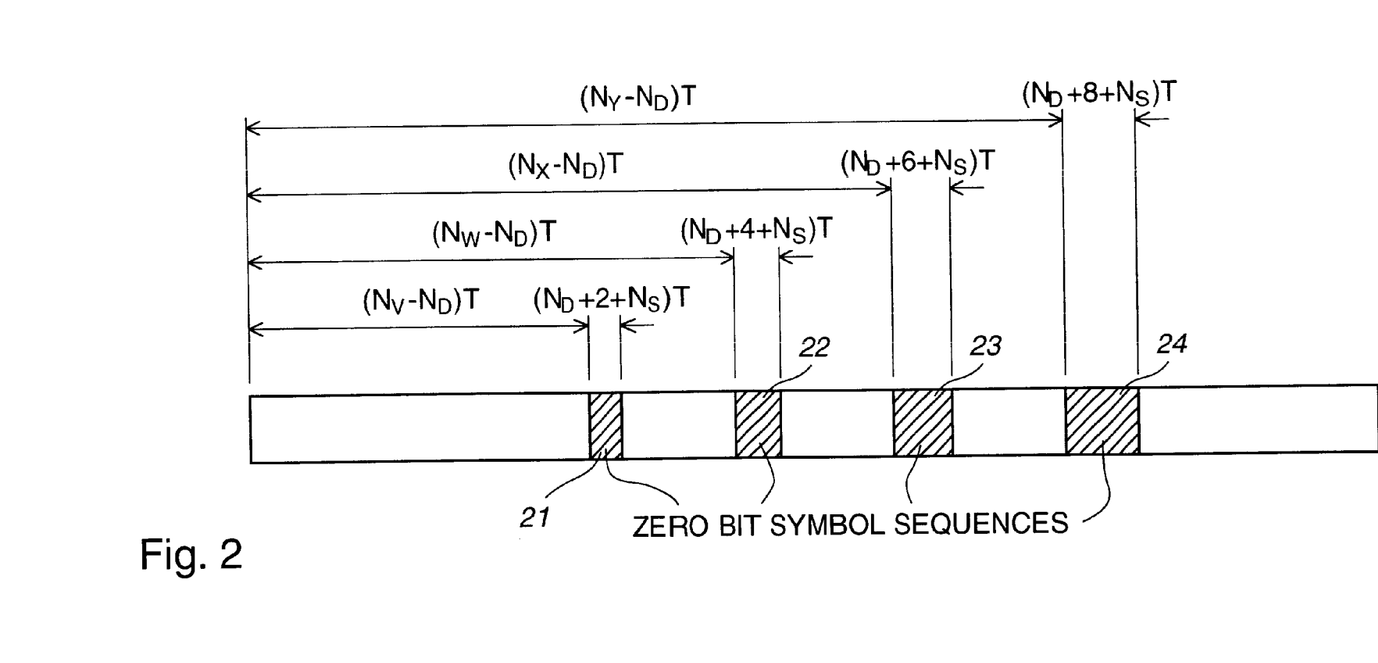
FIG. 2 is a modified illustration of the access burst, emphasizing sequences of consecutive zero bit symbols which are utilized in an embodiment of the invention.

FIG. 2 provides an alternative illustration of the access burst of FIG. 1 to emphasize the sequences of consecutive zero bit symbols. FIG. 2 illustrates that the zero bit symbol sequences, shown hatched in FIG. 2 and including the zero bit fields V, W, X, and Y, referenced 21 to 24 respectively, start at times $(N_V-N_D)T$, $(N_W-N_D)T$, $(N_X-N_D)T$, and $(N_Y-N_D)T$ respectively from the start of the access burst, where $N_V$, $N_W$, $N_X$, and $N_Y$ are the numbers of symbols between the start of the access burst and the start of the zero bit fields V, W, X, and Y respectively.

In order to provide a clear understanding of the operating principles of an embodiment of the invention described further below, by way of example a method in accordance with the invention is first described with reference to the flow chart in FIG. 3 assuming that only the last zero bit symbol sequence, comprising $N_D+8+N_S$ symbols including the zero bit field Y, is detected to determine the timing of the access burst. For simplicity it is also assumed here that there is only one periodic sample of the received signal for each symbol period, i.e. that the sampling rate is 1/T. It can be appreciated that, as further discussed below, it is generally preferable for there to be a plurality of samples per symbol period, so that the sampling rate is an integer (e.g. integer power of two) multiple of 1/T.

Figure 3:
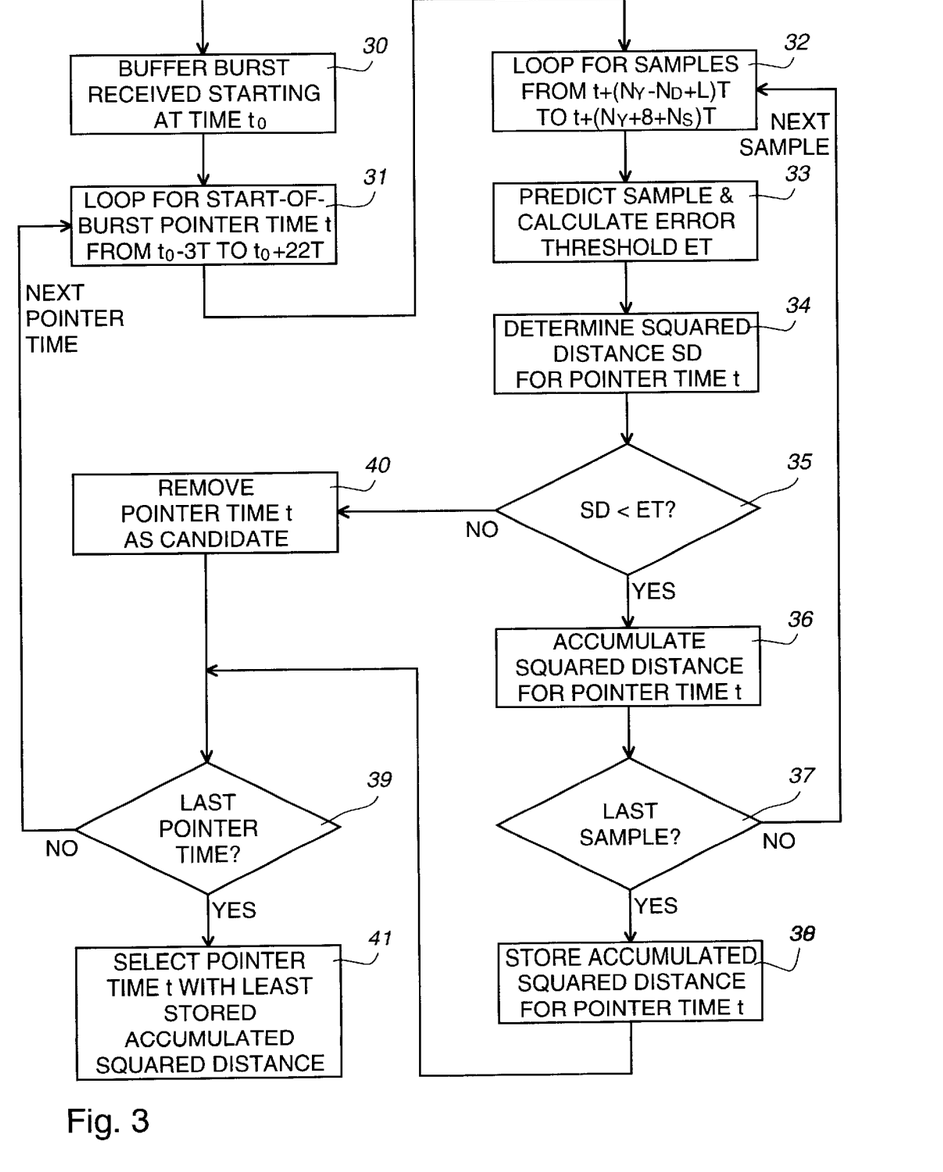
FIG. 3 is a flow chart with reference to which operation of an embodiment of the invention is explained.

Referring to FIG. 3, as represented by a block 30 samples of the received signal, constituting what is presumed by the base station to be an access burst received starting at a time $t_0$, are stored in known manner in a buffer. In accordance with the characteristics of an IS-54 system, the actual time alignment of the access burst can be from $t_0-3T$ to $t_0+22T$. Accordingly, in a block 31 a start-of-burst pointer to a stored sample in the buffer is set for an initial time $t=t_0-3T$, and a loop is started in which this start-of-burst pointer is moved successively, in 25 steps one sample at a time, to $t=t_0+22T$. Within each step of this loop, as shown by a block 32, steps of an inner loop are performed for samples in the buffer from a time $t+(N_Y-N_D+L)T$, potentially up to a last sample at a time $t+(N_Y+8+N_S)T$. As can be appreciated from the above description and the illustration in FIG. 2, if the start-of-burst pointer for the time t actually points to the start of the access burst, then this last sample in this inner loop would represent the last symbol of the zero bit symbol sequence 24 in FIG. 2, and the first sample in this inner loop would represent the (L+1)-th zero bit symbol in this sequence 24. It can also be appreciated that at the start of this inner loop the previous sample, representing the L-th symbol in the zero bit symbol sequence 24, is the first sample from which a reliable prediction can be made for samples representing subsequent zero bit symbols in the sequence 24, because the first L symbols of the sequence 24 are affected by channel dispersion from non-zero symbols of the access burst preceding the sequence 24.

For each (current) sample within the inner loop in FIG. 3, in a block 33 the base station predicts from the respective previous sample a complex value of the current sample assuming that the two symbols represented by these samples are identical; this is referred to here as the predicted sample. In the block 33 the base station also calculates an error threshold ET dependent upon the power of this respective previous sample. It can be appreciated that in the case of a plurality of samples per symbol period T, the prediction in the block 33 would likewise be for a similar plurality of predicted samples.

In a block 34, the base station determines the squared Euclidean distance between the current sample from the buffer and the predicted sample. As described here for only one sample per symbol period T, this squared distance SD is a difference or error power, i.e. $|a-\hat{a}|^2$ where a and â represent respectively the current sample and the predicted sample. However, the generic term squared distance is used also to include the case of plural samples per sample period. For example, with two samples per sample period, $a_1$ and $a_2$ representing the two current samples and $\hat{a}_1$ and $\hat{a}_2$ representing the predicted samples, the squared distance SD is given by $|a_1-\hat{a}_1|^2+|a_2-\hat{a}_2|^2$.

In a decision block 35 the base station then determines whether or not this squared distance SD is less than the determined error threshold ET. If the squared distance SD is less than the threshold ET, then the base station presumes that the symbol represented by the current sample is identical to the symbol represented by the respective previous sample and, as shown by a block 36, accumulates the squared distance SD for the current start-of-burst pointer time t. In a subsequent decision block 37, the base station determines whether the current sample is the last sample (representing the symbol at the time $t+(N_Y+8+N_S)T$) of the inner loop, and if not returns to the block 32 to continue in the inner loop with the next sample.

If the base station determines in the block 37 that the current sample is the last sample to be checked for the current start-of-burst pointer time t, then as shown by a block 38, the base station stores the accumulated squared distance for this pointer time t. In a subsequent decision block 39 the base station determines whether the current start-of-burst pointer time is the last to be checked (i.e. is equal to $t_0+22T$), and if not it returns to the block 31 to continue with the start-of-burst pointer incremented.

If in the decision block 35 the base station determines that the squared distance SD exceeds the error threshold ET, then it determines that the symbol represented by the current sample can not be identical to the symbol represented by the respective previous sample, and hence that the current start-of-burst pointer time t can not be the actual start of the access burst. Accordingly, as shown by a block 40 it removes the current start-of-burst pointer time t as a candidate for the start of the access burst and exits the inner loop, proceeding to the decision block 39. The removal of the current start-of-burst pointer time t as a candidate for the start of the access burst can be carried out in any desired manner, for example by setting a flag relating to this pointer time.

After checking the last start-of-burst pointer time, the base station proceeds from the decision block 39 to a block 41 in which it selects as the actual timing of the start of the access burst that start-of-burst pointer time t which corresponds to the least stored accumulated squared distance. Generally, there will be only one or two stored accumulated squared distances, the majority of start-of-burst pointer times having been removed as candidates in the block 40 as described above, so that this selection is very easily performed. If all of the start-of-burst pointer times have been removed as candidates, the base station determines that the access burst has not been detected and proceeds in known manner for this situation. The base station can likewise proceed in known manner using its determination of the actual timing of the start of the access burst, i.e. with the initial time alignment for the mobile station.

As discussed above, the preceding description assumes for simplicity that there is only one received signal sample per symbol period T, and it is more desirable in practice to provide a higher sampling rate providing a plurality of samples per symbol period T. In this case, a finer determination of the timing of the access burst can also be made by using the plurality of samples per symbol period. To this end, with a plurality of samples per symbol period stored in the received signal buffer, the above procedure can be used to provide an approximate (accurate to within the symbol period T) determination of the timing of the access burst, as described above using T-spaced samples selected from the buffer. For timings within the region of this approximate determination of the access burst timing, the same procedure can also be carried out on one or more different sets of T-spaced samples selected from the received signal buffer, and an optimum and more precise determination of the timing of the access burst made in a similar manner to that described above. The use of T-spaced samples in each case simplifies the implementation of the method while enabling the finer determination of timing, due to the plurality of samples per symbol period, to be achieved.

In any event, it can be appreciated that, having determined the actual timing of the access burst, the base station can readily check the relevant parts of the access burst for the appropriate sync word S and/or CDVCC word D. This checking is very simple because the precise timing of the access burst is now known, and coefficients for equalizing the channel characteristics to check the CDVCC word D can be determined by correlation during the immediately preceding sync word S and adaptively used during the CDVCC word on the basis that the channel does not change much during the 20T period of the adjacent words S and D. In comparison, the prior art checking for the sync word S, and checking the CDVCC word D, in access bursts of relatively unknown timing and with unknown channel characteristics is much more complex.

For convenience and simplicity of understanding, the above description with reference to FIG. 3 assumes that various steps are carried out in sequence, and consequently some steps such as the sample prediction and error threshold determination would be performed repeatedly. It can be appreciated that in practice the base station can be arranged to reduce computing requirements for carrying out the method by performing various steps in parallel and/or in different serial order, and storing calculated values as may be desirable.

Figure 4:
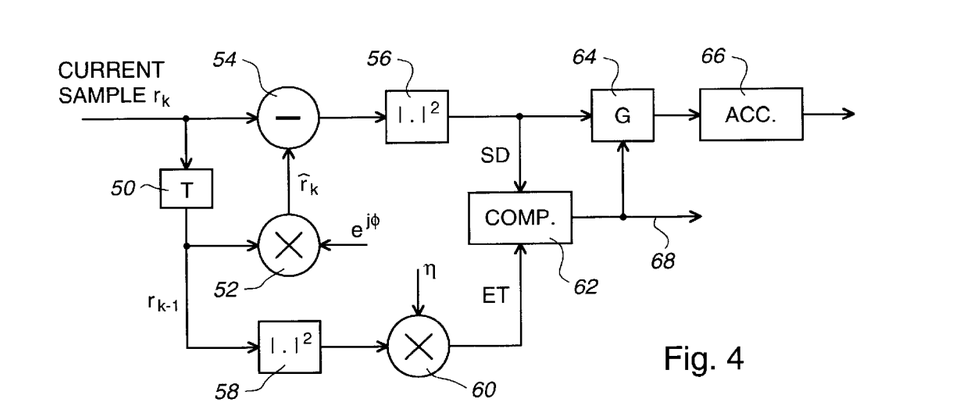
FIG. 4 illustrates an arrangement of functions for implementing steps in the flow chart of FIG. 3.

FIG. 4 illustrates an arrangement of functions, which for example can all be conveniently implemented in an application-specific integrated circuit (ASIC) or a digital signal processor (DSP), for implementing the blocks 33 to 36 of the flow chart of FIG. 3 consecutively for each current received signal sample $r_k$ in the inner loop defined between the blocks 32 and 37 of FIG. 3. Again for simplicity FIG. 4 and the description below relate to only one sample per symbol period, and the arrangement can easily be modified for a plurality of samples per symbol period as can be appreciated from the preceding description in this respect.

Referring to FIG. 4, for each current received signal sample $r_k$ the respective previous T-spaced sample $r_{k-1}$, produced at the output of a one symbol period T delay element 50 to which the current sample is supplied, is multiplied in a complex signal multiplier 52 by a differential phase factor $e^{j\phi}$ to produce a prediction $\hat{r}_k$ of the current sample assuming that the current and previous samples represent identical symbols. For the zero bit symbols of an IS-54 system as described above, $\phi=45°$. The prediction $\hat{r}_k$ of the current sample is subtracted from the actual current symbol $r_k$ in a complex signal subtractor 54, the output of which is a difference which constitutes a prediction error complex signal. The square of this difference, constituting the squared distance SD, is produced by a complex signal squarer 56 to which the difference signal is supplied.

The previous sample $r_{k-1}$ is also supplied to a complex signal squarer 58 which produces at its output a signal $P_{k-1}$ representing the instantaneous received power of this previous sample. This power signal $P_{k-1}$ is multiplied in a multiplier 60 by a predetermined constant $\eta$, which for example can be determined by computer simulation, to produce the error threshold ET. The error threshold ET is thereby set in dependence upon the power of the received signal, assuming a flat fading channel. It can be appreciated that other ways of producing and adapting the error threshold to accommodate fading and/or other channel characteristics can alternatively be used.

The squared distance SD is compared in a comparator 62 with the error threshold ET, and is also supplied to a gate (G) 64 controlled by a binary output of the comparator 62. In the event that SD<ET as determined by the comparator 62, the gate 64 is opened and the squared distance SD for the current sample is supplied to an accumulator 66 to be accumulated therein for the current start-of-burst pointer time as described above. Otherwise, the output of the comparator 62 controls the gate 64 to be closed, and via a line 68 serves to eliminate the current start-of-burst pointer time as a candidate as also described above.

From the above description, it can be seen that the unit 52 predicts the current sample, and the units 58 and 60 calculate the error threshold ET, from the previous sample at the output of the unit 50, as indicated by block 33 in FIG. 3. The units 54 and 56 determine the squared distance SD as indicated by block 34 in FIG. 3, and the comparator 62 performs the decision function of block 35. The accumulator 66 performs the function of block 36 of FIG. 3.

It can be appreciated that a similar arrangement can be provided for a system not using differential modulation, the complex signal multiplier being omitted and the predicted sample $\hat{r}_k$ being constituted by the previous sample $r_{k-1}$.

The above description relates only to the detection of the zero bit field Y, and substantially the same detection can be used to detect any one or more of the zero bit fields for which $N_T > L$ as described above. With typical channel dispersion for which L=1, the zero bit field V for which $N_Z = 2$ satisfies this condition but, unless $N_D$ and/or $N_S$ is greater than zero which is not generally the case, provides only a single symbol period prediction and comparison which in practice may not be very reliable. Consequently, it is preferred not to use the zero bit field V, but for each of the other zero bit fields W, X, and Y generally $N_T$ is sufficiently greater than L that the field can be used to produce reliable results for determining the timing of the access burst. It is advantageous to use together all three of these fields W, X, and Y for detection of the access burst timing, for example as described further below with reference to FIG. 5.

Figure 5:
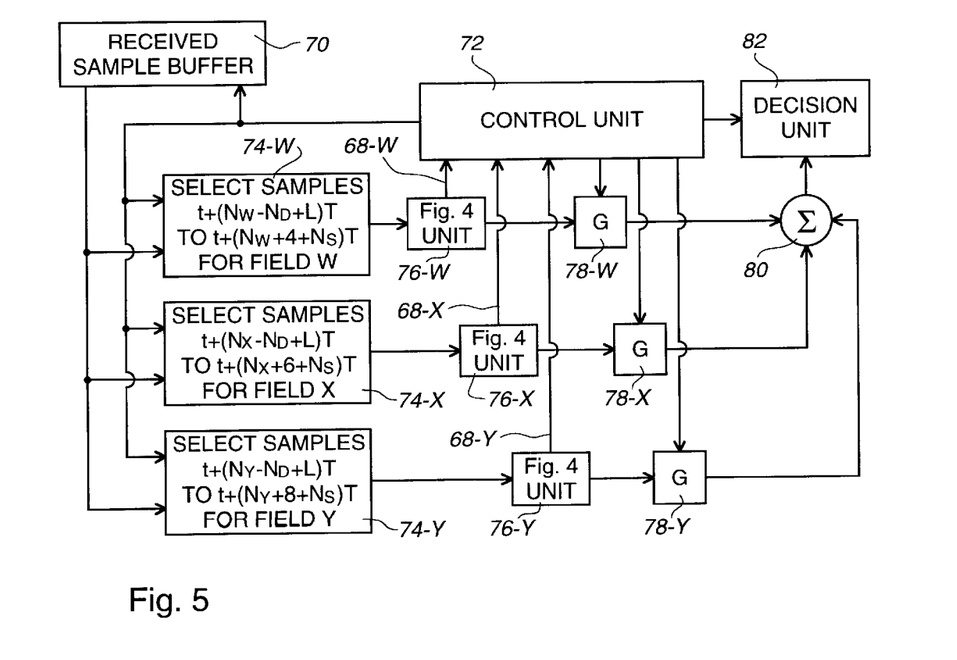
FIG. 5 illustrates an arrangement for detecting an access burst using a plurality of fields in the access burst.

Referring to FIG. 5, samples of a received signal are stored in a received signal sample buffer 70, and a control unit 72 provides the start-of-burst pointer for the time t as described above with reference to FIG. 3. Under the control of the control unit 72, a unit 74-Y selects samples from the buffer 70 for detecting the zero bit field Y in the manner described above in association with a unit 76-Y which is constituted by the arrangement of FIG. 4. The output line 68 of FIG. 4 constitutes a line 68-Y to the control unit 72 in the arrangement of FIG. 5, and an output of the accumulator 66 in FIG. 4 is supplied to a gate 78-Y, controlled by the control unit 72, in the arrangement of FIG. 5.

Similarly, a unit 74-X selects samples from the buffer 70 for detecting the zero bit field X in association with a unit 76-X as in FIG. 4 to provide outputs on a line 68-X and to a gate 78-X, and a unit 74-W selects samples from the buffer 70 for detecting the zero bit field W in association with a unit 76-W as in FIG. 4 to provide outputs on a line 68-W and to a gate 78-W. Except for the particular samples in the buffer 70 on which they operate, as indicated in FIG. 5 for the units 74-W and 74-X, the units 74-W, 76-W and 74-X, 76-X function in the same manner as described above for the units 74-Y, 76-Y. All of these units can be implemented by similar functions of an ASIC or DSP, the functions being performed serially or in parallel as may be desired.

The control unit 72 is responsive to signals on any of the lines 68 to increment the start-of-burst pointer as soon as the comparator 62 in any of the units 76 determines that the respective error threshold has been exceeded so that the current start-of-burst pointer can not be correct for detection of the respective zero bit field, thereby minimizing the amount of processing that is performed by the overall arrangement for rapidly eliminating incorrect start-of-burst pointer timings. For the correct start-of-burst timing the respective error thresholds are not exceeded in any of the units 76, and the control unit 72 then opens the gates 78 to supply the accumulated squared distances from the accumulators 66 in the units 76 to a summing unit 80, and the summed accumulated squared distances are supplied to a decision unit 82 also controlled by the control unit 72.

If there is more than one start-of-burst pointer time for which a sum of the accumulated squared distances is supplied to the decision unit 82, this unit 82 determines the actual access burst timing as corresponding to that timing producing the least sum, thereby replacing the function 41 (for the field Y) as described above with reference to FIG. 3. Alternatively a finer determination of the timing of the access burst can be carried out as described above using other T-spaced samples of the received signal also stored in the buffer 70.

The steps described above can optionally be extended and/or averaged over a plurality of repeated access bursts in order to confirm the accuracy of the determined timing over multiple time slots. In addition, as already stated above, the remainder of the access burst can be easily checked after its timing has been determined as described above, to verify the sync word(s) S and the CDVCC word(s) D.

Although the invention has been described above in relation to an IS-54 system using particular zero bit fields in each access burst, it can be appreciated that the invention can equally be applied to any system in which initial time alignment is to be determined from an access burst which includes one or more sequences of repeated identical transmission states, regardless of whether these are constituted by zero or non-zero bit fields. The invention can also be applied to systems including fixed and/or mobile stations and, with the changes noted above, to systems which do not use differential modulation.

Thus although particular embodiments of the invention have been described above, it should be appreciated that numerous modifications, variations; and adaptations may be made without departing from the scope of the invention as defined in the claims.

What is claimed is:

1. A method of detecting an access burst in a TDMA communications system using differential modulation, the access burst including at least one predetermined sequence of $N_T$ consecutive identical symbols in a predetermined position in the burst, where $N_T$ is an integer greater than an integer L representing a number of symbol periods over which the system has channel dispersion, comprising sampling a received signal and detecting the predetermined sequence in the received signal by the steps of, for each of $N_T$-L current symbol periods ending the predetermined sequence:

predicting at least one sample of the received signal in the current symbol period from at least one sample of the received signal in the preceding symbol period assuming identity of symbols represented by the received signal in the current and preceding symbol periods;

producing a squared distance between at least one sample of the received signal in the current symbol period and the predicted at least one sample; and comparing the squared distance with a threshold to determine said identity if the threshold is not exceeded.

2. A method as claimed in claim 1 further including the step of, for each of the $N_T$-L current symbol periods, producing the threshold in dependence upon a power of the received signal in the preceding symbol period.

3. A method as claimed in claim 1 further including the step of accumulating the squared distance for a plurality of the $N_T$-L current symbol periods.

4. A method as claimed in claim 1 wherein said steps are performed for each of a plurality of predetermined sequences in the access burst.

5. A method as claimed in claim 4 wherein each of the predetermined sequences represents a zero bit field in the access burst.

6. A method as claimed in claim 1 wherein the at least one predetermined sequence comprises at least one of zero bit fields W, X, and Y of an access burst of an IS-54 system, together with any zero bit symbols at the end of a CDVCC (coded digital verification colour code) word preceding, and any zero bit symbols at the beginning of a sync word following, each of said fields W, X, and Y.

7. A method as claimed in claim 6 wherein said steps are carried out for each of a plurality of said fields W, X, and Y.

8. A method of determining timing of an access burst received in a TDMA wireless communications system using differential modulation, the access burst including at least one predetermined sequence of $N_T$ consecutive identical symbols in a predetermined position in the burst, where $N_T$ is an integer greater than an integer L representing a number of symbol periods over which the system has channel dispersion, comprising the steps of:

sampling a received signal;

for each of a plurality of possible timings of the access burst, detecting whether the predetermined sequence is present in the respective position in the access burst by performing the following steps (a) to (d) either for $N_T$-L current symbol periods which end the predetermined sequence if the access burst has the respective timing or until the squared distance in step (d) for the current symbol exceeds the respective threshold:

(a) predicting at least one sample of the received signal in the current symbol period from at least one sample of the received signal in the preceding symbol period assuming identity of symbols represented by the received signal in the current and preceding symbol periods;

(b) producing a squared distance between predicted and received samples for the current symbol period;

(c) producing a threshold in dependence upon a power of the received signal for the preceding symbol period; and (d) comparing the squared distance with the threshold;

and determining the timing of the access burst in dependence upon results of the detection of the predetermined sequence for said possible timings of the access burst.

9. A method as claimed in claim 8 wherein the step of determining the timing of the access burst in dependence upon results of the detection of the predetermined sequence for said possible timings of the access burst comprises, for each of said possible timings for which steps (a) to (d) are carried out for $N_T$-L current symbol periods without the squared distance in step (d) exceeding the respective threshold, accumulating the squared distance produced in each step (b), and determining as the timing of the access burst one of said possible timings having a least accumulated squared distance.

10. A method as claimed in claim 8 wherein said steps (a) to (d) are performed, for each of the plurality of possible timings of the access burst, for each of a plurality of predetermined sequences in respective predetermined positions in the access burst.

11. A method as claimed in claim 8 wherein each of the predetermined sequences represents a zero bit field in the access burst.

12. A method as claimed in claim 8 wherein the at least one predetermined sequence comprises at least one of zero bit fields W, X, and Y of an access burst of an IS-54 system, together with any zero bit symbols at the end of a CDVCC (coded digital verification colour code) word preceding, and any zero bit symbols at the beginning of a sync word following each of said fields W, X, and Y.

13. A method as claimed in claim 12 wherein said steps (a) to (d) are performed, for each of the plurality of possible timings of the access burst, for each of a plurality of said fields W, X, and Y.

14. A method of detecting an access burst in a TDMA communications system not using differential modulation, the access burst including at least one predetermined sequence of $N_T$ consecutive identical symbols in a predetermined position in the burst, where $N_T$ is an integer greater than L+1 and L is an integer representing a number of symbol periods over which the system has channel dispersion, comprising sampling a received signal and detecting the predetermined sequence in the received signal by the steps of, for each of $N_T$-(L+1) current symbol periods ending the predetermined sequence, producing a squared distance between samples of the received signal in the current and preceding symbol periods, and comparing the squared distance with a threshold to determine said identity if the threshold is not exceeded.

15. A method as claimed in claim 14 further including the step of, for each of the $N_T$-(L+1) current symbol periods, producing the threshold in dependence upon a power of the received signal in the preceding symbol period.

16. A method as claimed in claim 15 further including the step of accumulating the squared distance for a plurality of current symbol periods.

17. A method as claimed in claim 16 wherein said steps are performed for each of a plurality of predetermined sequences in the access burst.

18. A method of detecting an access burst in a TDMA communications system, the access burst including a predetermined sequence of consecutive identical symbols in a predetermined position in the burst, comprising detecting the predetermined sequence by the steps of, for each of a plurality of current symbol periods of a subset of the consecutive identical symbols ending said predetermined sequence and for which a received signal waveform can be predicted from a received signal waveform in a preceding symbol period:

producing a prediction of the received signal waveform for the current symbol period from the received signal waveform for the preceding symbol period assuming identity of symbols in the current and preceding symbol periods;

producing a squared distance between the prediction and the received signal waveform for the current symbol period; and comparing the squared distance with a threshold to determine said identity if the threshold is not exceeded.

19. A method as claimed in claim 18 further including the step of, for each current symbol period, producing the threshold in dependence upon a power of the received signal win the preceding symbol period.

20. A method as claimed In claim 18 further including the step of accumulating the squared distance for said plurality of current symbol periods.

21. A method as claimed in claim 18 wherein said steps are performed for each of a plurality of predetermined sequences in the access burst.

22. Apparatus for detecting an access burst received in a TDMA communications system, comprising:

a buffer for samples of a received signal;

means for producing a squared distance between samples of the received signal in a current symbol period and a preceding symbol period;

means for producing a threshold dependent upon a power of the received signal in the preceding symbol period;

means for comparing the squared distance with the threshold thereby to determine identity of symbols in the current and preceding symbol periods when the squared distance is less than the threshold; and control means for controlling selection of samples supplied from the buffer as the samples of the received signal in the current and preceding symbol periods, the control means being responsive to an output of the means for comparing for identifying samples of the received signal representing a predetermined sequence of consecutive identical symbols in the access burst.

23. Apparatus as claimed in claim 22 wherein the TDMA communications system uses differential modulation and the means for producing the squared distance includes means for predicting at least one sample for the current symbol period from at least one sample for the preceding symbol period in accordance with the differential modulation assuming identity of symbols in the current and preceding symbol periods.

24. Apparatus as claimed in claim 23 further including means for accumulating the squared distance for a plurality of consecutive current symbol periods.

25. Apparatus as claimed in claim 24 wherein the control means is arranged for controlling said selection of samples supplied from the buffer for identifying samples of the received signal representing each of a plurality of predetermined sequences of consecutive identical symbols in the access burst.

* * * * *